United States Patent
Thirasuttakorn (10) Patent No.: US 9,246,819 B1
(45) Date of Patent: Jan. 26, 2016

(54) SYSTEM AND METHOD FOR PERFORMING MESSAGE-BASED LOAD BALANCING

(75) Inventor: Nat Thirasuttakorn, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 1094 days.

(21) Appl. No.: 13/164,672

(22) Filed: Jun. 20, 2011

(51) Int. Cl.
H04L 12/803 (2013.01)
H04L 29/06 (2006.01)

(52) U.S. Cl.
CPC .............. *H04L 47/125* (2013.01); *H04L 69/16* (2013.01)

(58) Field of Classification Search
None
See application file for complete search history.

(56) References Cited

U.S. PATENT DOCUMENTS

| | | |
|---|---|---|
| 3,950,735 A | 4/1976 | Patel |
| 4,644,532 A | 2/1987 | George et al. |
| 4,897,781 A | 1/1990 | Chang et al. |
| 4,965,772 A | 10/1990 | Daniel et al. |
| 5,023,826 A | 6/1991 | Patel |
| 5,053,953 A | 10/1991 | Patel |
| 5,167,024 A | 11/1992 | Smith et al. |
| 5,299,312 A | 3/1994 | Rocco, Jr. |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |

(Continued)

FOREIGN PATENT DOCUMENTS

| | | |
|---|---|---|
| EP | 0744850 A2 | 11/1996 |
| WO | 9114326 | 9/1991 |

(Continued)

OTHER PUBLICATIONS

Crescendo Networks, "Application Layer Processing (ALP)," 2003-2009, pp. 168-186, Chapter 9, CN-5000E/5500E, Foxit Software Company.

(Continued)

*Primary Examiner* — Ayaz Sheikh
*Assistant Examiner* — Faiyazkhan Ghafoerkhan
(74) *Attorney, Agent, or Firm* — LeClairRyan, a Professional Corporation (57) ABSTRACT

A system and method for message based load balancing comprises receiving, at a network traffic management device, an encapsulated request from a client device to a destination server for an established session. The request is encapsulated in accordance with a first connection-oriented protocol. The encapsulated message is segmented into a plurality of encapsulated data segments in accordance with a message boundary parameter. Identifying information of a first payload data packet of a first TCP encapsulated data segment is extracted and the first payload data packet is converted into a first connection-less protocol datagram. A message-based load balancing decision is performed on the datagram to assign the datagram to a first server. The first connection-less protocol datagram is converted into a first encapsulated data packet in accordance with a second connection-oriented protocol and is sent from a first virtual server to the first server based on the message-based load balancing decision.

27 Claims, 4 Drawing Sheets

(56) References Cited

U.S. PATENT DOCUMENTS

| | | | |
|---|---|---|---|
| 5,663,018 A | 9/1997 | Cummings et al. | |
| 5,752,023 A | 5/1998 | Choucri et al. | |
| 5,761,484 A | 6/1998 | Agarwal et al. | |
| 5,768,423 A | 6/1998 | Aref et al. | |
| 5,774,660 A | 6/1998 | Brendel et al. | |
| 5,790,554 A | 8/1998 | Pitcher et al. | |
| 5,802,052 A | 9/1998 | Venkataraman | |
| 5,812,550 A | 9/1998 | Sohn et al. | |
| 5,825,772 A | 10/1998 | Dobbins et al. | |
| 5,832,283 A | 11/1998 | Chou et al. | |
| 5,875,296 A | 2/1999 | Shi et al. | |
| 5,892,914 A | 4/1999 | Pitts | |
| 5,892,932 A | 4/1999 | Kim | |
| 5,919,247 A | 7/1999 | Van Hoff et al. | |
| 5,936,939 A | 8/1999 | Des Jardins et al. | |
| 5,941,988 A | 8/1999 | Bhagwat et al. | |
| 5,946,690 A | 8/1999 | Pitts | |
| 5,949,885 A | 9/1999 | Leighton | |
| 5,951,694 A | 9/1999 | Choquier et al. | |
| 5,959,990 A | 9/1999 | Frantz et al. | |
| 5,974,460 A | 10/1999 | Maddalozzo, Jr. et al. | |
| 5,983,281 A * | 11/1999 | Ogle | H04L 67/1036 370/401 |
| 5,988,847 A | 11/1999 | McLaughlin et al. | |
| 6,006,260 A | 12/1999 | Barrick, Jr. et al. | |
| 6,006,264 A * | 12/1999 | Colby | H04L 12/5695 709/220 |
| 6,026,452 A | 2/2000 | Pitts | |
| 6,028,857 A | 2/2000 | Poor | |
| 6,051,169 A | 4/2000 | Brown et al. | |
| 6,078,956 A | 6/2000 | Bryant et al. | |
| 6,085,234 A | 7/2000 | Pitts et al. | |
| 6,092,196 A | 7/2000 | Reiche | |
| 6,108,703 A | 8/2000 | Leighton et al. | |
| 6,111,876 A | 8/2000 | Frantz et al. | |
| 6,128,279 A | 10/2000 | O'Neil et al. | |
| 6,128,657 A * | 10/2000 | Okanoya | G06F 9/505 709/224 |
| 6,160,874 A * | 12/2000 | Dickerman | G06Q 20/4037 379/114.19 |
| 6,170,022 B1 | 1/2001 | Linville et al. | |
| 6,178,423 B1 | 1/2001 | Douceur et al. | |
| 6,182,139 B1 * | 1/2001 | Brendel | H04L 29/06 709/201 |
| 6,192,051 B1 | 2/2001 | Lipman et al. | |
| 6,233,612 B1 | 5/2001 | Fruchtman et al. | |
| 6,246,684 B1 | 6/2001 | Chapman et al. | |
| 6,253,226 B1 | 6/2001 | Chidambaran et al. | |
| 6,253,230 B1 | 6/2001 | Couland et al. | |
| 6,263,368 B1 | 7/2001 | Martin | |
| 6,289,012 B1 | 9/2001 | Harrington et al. | |
| 6,298,380 B1 | 10/2001 | Coile et al. | |
| 6,327,622 B1 | 12/2001 | Jindal et al. | |
| 6,343,324 B1 | 1/2002 | Hubis et al. | |
| 6,347,339 B1 | 2/2002 | Morris et al. | |
| 6,360,270 B1 | 3/2002 | Cherkasova et al. | |
| 6,374,300 B2 | 4/2002 | Masters | |
| 6,396,833 B1 | 5/2002 | Zhang et al. | |
| 6,430,562 B1 | 8/2002 | Kardos et al. | |
| 6,434,081 B1 | 8/2002 | Johnson et al. | |
| 6,480,476 B1 | 11/2002 | Willars | |
| 6,484,261 B1 | 11/2002 | Wiegel | |
| 6,490,624 B1 | 12/2002 | Sampson et al. | |
| 6,510,135 B1 | 1/2003 | Almulhem et al. | |
| 6,510,458 B1 | 1/2003 | Berstis et al. | |
| 6,519,643 B1 | 2/2003 | Foulkes et al. | |
| 6,601,084 B1 * | 7/2003 | Bhaskaran | G06F 9/505 709/223 |
| 6,636,503 B1 | 10/2003 | Shiran et al. | |
| 6,636,894 B1 | 10/2003 | Short et al. | |
| 6,650,640 B1 | 11/2003 | Muller et al. | |
| 6,650,641 B1 * | 11/2003 | Albert | H04L 29/12009 370/392 |
| 6,654,701 B2 | 11/2003 | Hatley | |
| 6,683,873 B1 | 1/2004 | Kwok et al. | |
| 6,691,165 B1 | 2/2004 | Bruck et al. | |
| 6,694,517 B1 | 2/2004 | James et al. | |
| 6,708,187 B1 | 3/2004 | Shanumgam et al. | |
| 6,718,380 B1 | 4/2004 | Mohaban et al. | |
| 6,742,045 B1 * | 5/2004 | Albert | H04L 69/16 370/236 |
| 6,751,663 B1 | 6/2004 | Farrell et al. | |
| 6,754,228 B1 | 6/2004 | Ludwig | |
| 6,760,775 B1 | 7/2004 | Anerousis et al. | |
| 6,772,219 B1 | 8/2004 | Shobatake | |
| 6,779,039 B1 | 8/2004 | Bommareddy et al. | |
| 6,781,986 B1 | 8/2004 | Sabaa et al. | |
| 6,798,777 B1 | 9/2004 | Ferguson et al. | |
| 6,804,542 B1 | 10/2004 | Haartsen | |
| 6,816,901 B1 | 11/2004 | Sitaraman et al. | |
| 6,816,977 B2 | 11/2004 | Brakmo et al. | |
| 6,829,238 B2 | 12/2004 | Tokuyo et al. | |
| 6,868,082 B1 | 3/2005 | Allen, Jr. et al. | |
| 6,876,629 B2 | 4/2005 | Beshai et al. | |
| 6,876,654 B1 | 4/2005 | Hegde | |
| 6,888,836 B1 | 5/2005 | Cherkasova | |
| 6,928,082 B2 | 8/2005 | Liu et al. | |
| 6,947,985 B2 | 9/2005 | Hegli et al. | |
| 6,950,434 B1 | 9/2005 | Viswanath et al. | |
| 6,954,780 B2 | 10/2005 | Susai et al. | |
| 6,957,272 B2 | 10/2005 | Tallegas et al. | |
| 6,959,394 B1 | 10/2005 | Brickell et al. | |
| 6,975,592 B1 | 12/2005 | Seddigh et al. | |
| 6,987,763 B2 | 1/2006 | Rochberger et al. | |
| 7,007,092 B2 | 2/2006 | Peiffer | |
| 7,113,993 B1 | 9/2006 | Cappiello et al. | |
| 7,133,944 B2 | 11/2006 | Song et al. | |
| 7,139,792 B1 | 11/2006 | Mishra et al. | |
| 7,228,422 B2 | 6/2007 | Morioka et al. | |
| 7,283,470 B1 | 10/2007 | Sindhu et al. | |
| 7,287,082 B1 | 10/2007 | O'Toole, Jr. | |
| 7,295,827 B2 | 11/2007 | Liu et al. | |
| 7,308,703 B2 | 12/2007 | Wright et al. | |
| 7,321,926 B1 | 1/2008 | Zhang et al. | |
| 7,333,999 B1 | 2/2008 | Njemanze | |
| 7,343,413 B2 | 3/2008 | Gilde et al. | |
| 7,349,391 B2 | 3/2008 | Ben-Dor et al. | |
| 7,398,552 B2 | 7/2008 | Pardee et al. | |
| 7,433,962 B2 | 10/2008 | Janssen et al. | |
| 7,454,480 B2 | 11/2008 | Labio et al. | |
| 7,490,162 B1 | 2/2009 | Masters | |
| 7,500,243 B2 | 3/2009 | Huetsch et al. | |
| 7,500,269 B2 | 3/2009 | Huotari et al. | |
| 7,505,795 B1 | 3/2009 | Lim et al. | |
| 7,516,492 B1 | 4/2009 | Nisbet et al. | |
| 7,526,541 B2 | 4/2009 | Roese et al. | |
| 7,558,197 B1 | 7/2009 | Sindhu et al. | |
| 7,580,971 B1 | 8/2009 | Gollapudi et al. | |
| 7,624,424 B2 | 11/2009 | Morita et al. | |
| 7,644,137 B2 | 1/2010 | Bozak et al. | |
| 7,668,166 B1 | 2/2010 | Rekhter et al. | |
| 7,706,261 B2 | 4/2010 | Sun et al. | |
| 7,724,657 B2 | 5/2010 | Rao et al. | |
| 7,725,093 B2 | 5/2010 | Sengupta et al. | |
| 7,778,187 B2 | 8/2010 | Chaturvedi et al. | |
| 7,801,978 B1 | 9/2010 | Susai et al. | |
| 7,831,662 B2 | 11/2010 | Clark et al. | |
| 7,876,677 B2 | 1/2011 | Cheshire | |
| 7,908,314 B2 | 3/2011 | Yamaguchi et al. | |
| 7,925,908 B2 | 4/2011 | Kim | |
| 7,933,946 B2 | 4/2011 | Livshits et al. | |
| 7,945,908 B1 | 5/2011 | Waldspurger et al. | |
| 7,984,141 B2 | 7/2011 | Gupta et al. | |
| 8,130,650 B2 | 3/2012 | Allen, Jr. et al. | |
| 8,199,757 B2 | 6/2012 | Pani et al. | |
| 8,351,333 B2 * | 1/2013 | Rao | H04L 1/1854 370/235 |
| 8,380,854 B2 | 2/2013 | Szabo | |
| 8,447,871 B1 | 5/2013 | Szabo | |
| 8,464,265 B2 | 6/2013 | Worley | |
| 8,606,921 B2 * | 12/2013 | Vasquez et al. | 709/226 |
| 8,615,022 B2 * | 12/2013 | Harrison | H04L 12/4633 370/235 |

(56) References Cited

U.S. PATENT DOCUMENTS

| | | | |
|---|---|---|---|
| 8,665,868 B2* | 3/2014 | Kay | H04L 63/1416 370/389 |
| 8,701,179 B1 | 4/2014 | Penno et al. | |
| 8,778,665 B2 | 7/2014 | Glide et al. | |
| 8,804,504 B1 | 8/2014 | Chen | |
| 8,830,874 B2 | 9/2014 | Cho et al. | |
| 9,036,529 B2* | 5/2015 | Erickson | H04W 52/0212 370/254 |
| 2001/0009554 A1* | 7/2001 | Katseff | H04L 12/6418 370/466 |
| 2001/0023442 A1* | 9/2001 | Masters | H04L 67/1008 709/227 |
| 2002/0046291 A1* | 4/2002 | O'Callaghan | H04L 69/22 709/238 |
| 2002/0049842 A1 | 4/2002 | Huetsch et al. | |
| 2002/0059428 A1 | 5/2002 | Susai et al. | |
| 2002/0083067 A1 | 6/2002 | Tamayo et al. | |
| 2002/0095498 A1* | 7/2002 | Chanda | H04L 12/2889 709/225 |
| 2002/0138615 A1 | 9/2002 | Schmeling | |
| 2002/0161913 A1 | 10/2002 | Gonzalez et al. | |
| 2002/0194342 A1 | 12/2002 | Lu et al. | |
| 2002/0198993 A1 | 12/2002 | Cudd et al. | |
| 2003/0046291 A1 | 3/2003 | Fascenda | |
| 2003/0065653 A1* | 4/2003 | Overton | H04L 29/06 |
| 2003/0065951 A1 | 4/2003 | Igeta et al. | |
| 2003/0069918 A1* | 4/2003 | Lu | G06F 9/505 718/105 |
| 2003/0069974 A1* | 4/2003 | Lu et al. | 709/226 |
| 2003/0070069 A1 | 4/2003 | Belapurkar et al. | |
| 2003/0086415 A1 | 5/2003 | Bernhard et al. | |
| 2003/0105983 A1 | 6/2003 | Brakmo et al. | |
| 2003/0108052 A1* | 6/2003 | Inoue | H04L 29/12377 370/399 |
| 2003/0128708 A1* | 7/2003 | Inoue | H04L 29/06 370/395.42 |
| 2003/0145062 A1 | 7/2003 | Sharma et al. | |
| 2003/0145233 A1 | 7/2003 | Poletto et al. | |
| 2003/0163576 A1 | 8/2003 | Janssen et al. | |
| 2003/0208596 A1* | 11/2003 | Carolan | H04L 63/0209 709/225 |
| 2003/0225485 A1 | 12/2003 | Fritz et al. | |
| 2004/0003287 A1 | 1/2004 | Zissimopoulos et al. | |
| 2004/0072569 A1* | 4/2004 | Omae | H04W 8/065 455/445 |
| 2004/0103283 A1 | 5/2004 | Hornak | |
| 2004/0111523 A1* | 6/2004 | Hall | H04L 29/06 709/230 |
| 2004/0111621 A1 | 6/2004 | Himberger et al. | |
| 2004/0117493 A1 | 6/2004 | Bazot et al. | |
| 2004/0151186 A1* | 8/2004 | Akama | H04L 29/12311 370/395.3 |
| 2004/0210663 A1* | 10/2004 | Phillips | H04L 67/1008 709/230 |
| 2004/0255000 A1* | 12/2004 | Simionescu | G06F 9/4416 709/208 |
| 2004/0264472 A1* | 12/2004 | Oliver | H04L 12/5693 370/395.4 |
| 2004/0264481 A1* | 12/2004 | Darling | H04L 29/06 370/401 |
| 2004/0267920 A1* | 12/2004 | Hydrie | H04L 29/06 709/223 |
| 2004/0267948 A1* | 12/2004 | Oliver | H04L 12/5693 709/230 |
| 2004/0268358 A1* | 12/2004 | Darling | H04L 29/06 718/105 |
| 2005/0004887 A1 | 1/2005 | Igakura et al. | |
| 2005/0021736 A1 | 1/2005 | Carusi et al. | |
| 2005/0027869 A1 | 2/2005 | Johnson | |
| 2005/0044213 A1 | 2/2005 | Kobayashi et al. | |
| 2005/0052440 A1 | 3/2005 | Kim et al. | |
| 2005/0055435 A1* | 3/2005 | Gbadegesin | H04L 29/06 709/224 |
| 2005/0071283 A1* | 3/2005 | Randle | G06Q 20/04 705/75 |
| 2005/0078604 A1* | 4/2005 | Yim | H04L 69/16 370/235 |
| 2005/0122977 A1 | 6/2005 | Lieberman | |
| 2005/0154837 A1 | 7/2005 | Keohane et al. | |
| 2005/0187866 A1 | 8/2005 | Lee | |
| 2005/0188220 A1 | 8/2005 | Nilsson et al. | |
| 2005/0198310 A1* | 9/2005 | Kim | H04L 61/2076 709/227 |
| 2005/0262238 A1 | 11/2005 | Reeves et al. | |
| 2005/0288939 A1* | 12/2005 | Peled | G06F 21/10 709/229 |
| 2006/0031520 A1 | 2/2006 | Bedekar et al. | |
| 2006/0059267 A1 | 3/2006 | Cugi et al. | |
| 2006/0077902 A1 | 4/2006 | Kannan et al. | |
| 2006/0083205 A1* | 4/2006 | Buddhikot | H04W 16/14 370/338 |
| 2006/0112176 A1* | 5/2006 | Liu | H04L 29/12066 709/245 |
| 2006/0112272 A1* | 5/2006 | Morioka | H04L 63/0227 713/171 |
| 2006/0129684 A1 | 6/2006 | Datta | |
| 2006/0135198 A1 | 6/2006 | Lee | |
| 2006/0156416 A1 | 7/2006 | Huotari et al. | |
| 2006/0161577 A1* | 7/2006 | Kulkarni | H04L 67/1008 |
| 2006/0168070 A1* | 7/2006 | Thompson | G06F 9/542 709/206 |
| 2006/0171365 A1 | 8/2006 | Borella | |
| 2006/0179153 A1* | 8/2006 | Lee | H04L 67/32 709/231 |
| 2006/0182103 A1* | 8/2006 | Martini | H04L 63/0428 370/389 |
| 2006/0209853 A1* | 9/2006 | Hidaka | H04L 47/10 370/401 |
| 2006/0230148 A1* | 10/2006 | Forecast | H04L 69/16 709/226 |
| 2006/0233106 A1 | 10/2006 | Achlioptas et al. | |
| 2006/0242300 A1* | 10/2006 | Yumoto | H04L 29/06027 709/226 |
| 2006/0291483 A1* | 12/2006 | Sela | H04M 1/0262 370/401 |
| 2007/0006293 A1* | 1/2007 | Balakrishnan | H04L 63/0245 726/13 |
| 2007/0016662 A1* | 1/2007 | Desai | H04L 67/1027 709/223 |
| 2007/0019658 A1* | 1/2007 | Park | H04L 29/06027 370/410 |
| 2007/0050843 A1* | 3/2007 | Manville | H04L 29/06027 726/12 |
| 2007/0058670 A1* | 3/2007 | Konduru | H04L 69/169 370/466 |
| 2007/0064661 A1 | 3/2007 | Sood et al. | |
| 2007/0083646 A1 | 4/2007 | Miller et al. | |
| 2007/0088822 A1* | 4/2007 | Coile | H01R 31/005 709/224 |
| 2007/0106796 A1 | 5/2007 | Kudo et al. | |
| 2007/0107048 A1 | 5/2007 | Halls et al. | |
| 2007/0118879 A1 | 5/2007 | Yeun | |
| 2007/0174491 A1 | 7/2007 | Still et al. | |
| 2007/0220598 A1 | 9/2007 | Salowey et al. | |
| 2007/0233809 A1* | 10/2007 | Brownell | H04L 29/12009 709/218 |
| 2007/0258451 A1* | 11/2007 | Bouat | H04L 29/06 370/389 |
| 2007/0297410 A1 | 12/2007 | Yoon et al. | |
| 2007/0297551 A1 | 12/2007 | Choi | |
| 2008/0008202 A1* | 1/2008 | Terrell | H04L 12/5693 370/401 |
| 2008/0025297 A1* | 1/2008 | Kashyap | G06F 9/5077 370/389 |
| 2008/0034136 A1 | 2/2008 | Ulenas | |
| 2008/0072303 A1 | 3/2008 | Syed | |
| 2008/0120370 A1* | 5/2008 | Chan | G06Q 10/10 709/204 |
| 2008/0133518 A1 | 6/2008 | Kapoor et al. | |
| 2008/0134311 A1 | 6/2008 | Medvinsky et al. | |
| 2008/0148340 A1 | 6/2008 | Powell et al. | |
| 2008/0159145 A1 | 7/2008 | Muthukrishnan et al. | |
| 2008/0165801 A1* | 7/2008 | Sheppard | H04L 41/0226 370/465 |

(56) References Cited

U.S. PATENT DOCUMENTS

| | | | |
|---|---|---|---|
| 2008/0178278 A1 | 7/2008 | Grinstein et al. | |
| 2008/0201599 A1 | 8/2008 | Ferraiolo et al. | |
| 2008/0205613 A1 | 8/2008 | Lopez | |
| 2008/0222646 A1 | 9/2008 | Sigal et al. | |
| 2008/0225710 A1* | 9/2008 | Raja | G06F 9/505 370/230.1 |
| 2008/0229415 A1* | 9/2008 | Kapoor | G06F 21/55 726/22 |
| 2008/0239986 A1* | 10/2008 | Xu | H04L 41/12 370/254 |
| 2008/0253395 A1* | 10/2008 | Pandya | H04L 29/06 370/469 |
| 2008/0256224 A1 | 10/2008 | Kaji et al. | |
| 2008/0288661 A1 | 11/2008 | Galles | |
| 2008/0301760 A1 | 12/2008 | Lim | |
| 2008/0316922 A1* | 12/2008 | Riddle | H04L 41/0893 370/230 |
| 2009/0028337 A1 | 1/2009 | Balabine et al. | |
| 2009/0049230 A1 | 2/2009 | Pandya | |
| 2009/0070617 A1 | 3/2009 | Arimilli et al. | |
| 2009/0077619 A1* | 3/2009 | Boyce | G06F 21/55 726/1 |
| 2009/0094610 A1* | 4/2009 | Sukirya | G06F 9/5083 718/105 |
| 2009/0119504 A1 | 5/2009 | van Os et al. | |
| 2009/0125496 A1 | 5/2009 | Wexler et al. | |
| 2009/0125532 A1 | 5/2009 | Wexler et al. | |
| 2009/0125625 A1* | 5/2009 | Shim | H04L 67/1002 709/226 |
| 2009/0138749 A1 | 5/2009 | Moll et al. | |
| 2009/0141891 A1 | 6/2009 | Boyen et al. | |
| 2009/0157678 A1 | 6/2009 | Turk | |
| 2009/0196282 A1 | 8/2009 | Fellman et al. | |
| 2009/0228956 A1 | 9/2009 | He et al. | |
| 2009/0287935 A1 | 11/2009 | Aull et al. | |
| 2009/0296624 A1* | 12/2009 | Ryu | H04H 20/72 370/312 |
| 2009/0300407 A1* | 12/2009 | Kamath | G06F 9/505 714/4.11 |
| 2010/0011434 A1* | 1/2010 | Kay | H04L 12/2602 726/14 |
| 2010/0017846 A1 | 1/2010 | Huang et al. | |
| 2010/0023582 A1 | 1/2010 | Pedersen et al. | |
| 2010/0071048 A1 | 3/2010 | Novak et al. | |
| 2010/0115236 A1 | 5/2010 | Bataineh et al. | |
| 2010/0122091 A1 | 5/2010 | Huang et al. | |
| 2010/0150154 A1 | 6/2010 | Viger et al. | |
| 2010/0165877 A1 | 7/2010 | Shukla et al. | |
| 2010/0242092 A1 | 9/2010 | Harris et al. | |
| 2010/0251330 A1 | 9/2010 | Kroeselberg et al. | |
| 2010/0279733 A1* | 11/2010 | Karsten | H04W 48/18 455/552.1 |
| 2010/0322250 A1 | 12/2010 | Shetty et al. | |
| 2010/0325277 A1 | 12/2010 | Muthiah et al. | |
| 2011/0040889 A1 | 2/2011 | Garrett et al. | |
| 2011/0047620 A1 | 2/2011 | Mahaffey et al. | |
| 2011/0066718 A1 | 3/2011 | Susai et al. | |
| 2011/0153822 A1 | 6/2011 | Rajan et al. | |
| 2011/0154443 A1* | 6/2011 | Thakur | G06F 21/41 726/3 |
| 2011/0173295 A1 | 7/2011 | Bakke et al. | |
| 2011/0184733 A1* | 7/2011 | Yu | G10L 19/12 704/219 |
| 2011/0246800 A1 | 10/2011 | Accpadi et al. | |
| 2011/0273984 A1 | 11/2011 | Hsu et al. | |
| 2011/0282997 A1 | 11/2011 | Prince et al. | |
| 2011/0321122 A1 | 12/2011 | Mwangi et al. | |
| 2012/0016994 A1 | 1/2012 | Nakamura et al. | |
| 2012/0039341 A1* | 2/2012 | Latif | H04L 12/06 370/466 |
| 2012/0041965 A1* | 2/2012 | Vasquez | H04L 43/028 707/758 |
| 2012/0063314 A1* | 3/2012 | Pignataro | H04L 12/4633 370/235 |
| 2012/0066489 A1 | 3/2012 | Ozaki et al. | |
| 2012/0101952 A1 | 4/2012 | Raleigh et al. | |
| 2012/0311153 A1 | 12/2012 | Morgan | |
| 2012/0317266 A1 | 12/2012 | Abbott | |
| 2013/0336122 A1* | 12/2013 | Baruah | H04L 45/24 370/235 |
| 2014/0040478 A1 | 2/2014 | Hsu et al. | |
| 2014/0095661 A1 | 4/2014 | Knowles et al. | |

FOREIGN PATENT DOCUMENTS

| | | |
|---|---|---|
| WO | 9505712 | 2/1995 |
| WO | 9905829 | 2/1997 |
| WO | 9709805 | 3/1997 |
| WO | 9745800 | 12/1997 |
| WO | 9906913 | 2/1999 |
| WO | 9910858 | 3/1999 |
| WO | 9939373 | 8/1999 |
| WO | 9964967 | 12/1999 |
| WO | 0004422 | 1/2000 |
| WO | 0004458 | 1/2000 |

OTHER PUBLICATIONS

"A Process for Selective Routing of Servlet Content to Transcoding Modules," Research Disclosure 422124, Jun. 1999, pp. 889-890, IBM Corporation.
"Big-IP Controller with Exclusive OneConnect Content Switching Feature Provides a Breakthrough System for Maximizing Server and Network Performance," F5 Networks, Inc. Press Release, May 8, 2001, 2 pages, Las Vegas, Nevada.
Fielding et al., "Hypertext Transfer Protocol—HTTP/1.1," Network Working Group, RFC: 2068, Jan. 1997, pp. 1-162.
Fielding et al., "Hypertext Transfer Protocol—HTTP/1.1," Network Working Group, RFC: 2616, Jun. 1999, pp. 1-176.
Floyd et al., "Random Early Detection Gateways for Congestion Avoidance," Aug. 1993, pp. 1-22, IEEE/ACM Transactions on Networking, California.
Hochmuth, Phil, "F5, CacheFlow pump up content-delivery lines," Network World Fusion, May 4, 2001, 1 page, Las Vegas, Nevada.
"Servlet/Applet/HTML Authentication Process With Single Sign-On," Research Disclosure 429128, Jan. 2000, pp. 163-164, IBM Corporation.
"Traffic Surges; Surge Queue; Netscaler Defense," 2005, PowerPoint Presentation, slides 1-12, Citrix Systems, Inc.
MacVittie, Lori, "Message-Based Load Balancing," Technical Brief, Jan. 2010, pp. 1-9, F5 Networks, Inc.
Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.
OWASP, "Testing for Cross site scripting", OWASP Testing Guide v2, Table of Contents, Feb. 24, 2011, pp. 1-5, (www.owasp.org/index.php/Testing_for_Cross_site_scripting).
International Search Report and the Written Opinion, for International Patent Application No. PCT/US2013/026615, Date of Mailing: Jul. 4, 2013.
F5 Networks Inc., "Configuration Guide for Local Traffic Management," F5 Networks Inc., Jan. 2006, version 9.2.2, 406 pgs.
U.S. Appl. No. 13/400,398 to Paul Jiang, filed Feb. 20, 2012.
U.S. Appl. No. 13/234,042 to Baumann et al., filed Sep. 15, 2011.
U.S. Appl. No. 13/234,047 to Wojcik et al., filed Sep. 15, 2011.
U.S. Appl. No. 12/822,146 to Jeff Costlow, filed Jun. 23, 2010.
U.S. Appl. No. 13/235,276 to Hawthorne et al., filed Sep. 16, 2011.
U.S. Appl. No. 13/234,031 to Baumann et al., filed Sep. 15, 2011.
U.S. Appl. No. 13/165,783 to Jain et al., filed Jun. 21, 2011.

* cited by examiner

SYSTEM AND METHOD FOR PERFORMING MESSAGE-BASED LOAD BALANCING

TECHNOLOGICAL FIELD

This technology generally relates to network traffic management, and more particularly, to a system and method for performing message-based load balancing.

BACKGROUND

Load balancing has been integral to providing high availability and scalability to web-based and non web-based applications. However, the type of protocol used in network communications between the client devices and the servers affect the ability to effectively handle load balancing. The HTTP protocol, for example, is synchronous and stateless, whereas other protocols such as Diameter, RADIUS, and Session Initiation Protocol (SIP) are asynchronous and do not adhere to a single request-reply communication sequence. The use of such asynchronous protocols makes it difficult to perform load balancing, because most load balancing systems are designed to operate in a synchronous messaging environment where a single request is made and responded to before another is processed.

Asynchronous protocols such as Diameter and SIP also maintain the one-to-one (1:1) relationship in which there is always a matching reply for every request. However, unlike traditional web-based protocols, they do not need to maintain a strict synchronous exchange. In other words, multiple requests may be sent before a reply is received in an asynchronous protocol. This makes load balancing systems that use traditional protocols, like HTTP or TCP, unable to handle load balancing responsibilities as they cannot process more than one request at a time and are limited to load balancing on a per-connection basis.

Load balancing is accomplished in typical systems at the Layer 4 (TCP) protocol on a per-session or per-connection basis. All requests received over the same session are load balanced to the same server. When communications are complete, the session is terminated. This behavior is not acceptable for some protocols, particularly those associated with service provider and telecommunications implementations that utilize SIP, Diameter, Lightweight Directory Access Protocol (LDAP) and RADIUS protocols. These protocols carry communications over longer-lived sessions, whereby the communications are potentially required to be processed by different servers. This means traditional load balancing mechanisms are incapable of supporting the scalability and availability requirements of such protocols.

In a typical synchronous request-reply protocol, such as TCP, each request can be directed to a specific server based on a variety of parameters, such as the content or request type. This behavior is also desirable in message-oriented communication, but it is typically more difficult to support for SIP, RADIUS and Diameter protocols due to the need to scale intermediaries to open and maintain multiple connections to different servers. As stated above, traditional TCP based load balancing maintains a 1:1 ratio between requests and server-side connections. However, in a message-oriented protocol such as SIP or Diameter, there may be a need to maintain a one-to-many (1:N) ratio between requests and server-side connections. One way to solve the challenges associated with scaling message oriented protocols such as SIP and Diameter is the ability to extract individual messages out of a single, shared TCP connection.

What is needed is a system and method that is configured to inspect application layer data in split out individual messages from a connection-oriented protocol and distribute them appropriately to different servers using a connection-less protocol.

SUMMARY

In an aspect, a method for message based load balancing comprises receiving, at a network traffic management device, an encapsulated request from a client device to a destination server for an established session, wherein the request is encapsulated in accordance with a first connection-oriented protocol. The method includes segmenting the encapsulated message into a plurality of encapsulated data segments in accordance with a message boundary parameter. The method includes extracting identifying information of a first payload data packet of a first encapsulated data segment. The method includes converting the first payload data packet into a first connection-less protocol datagram at the network traffic management device. The method includes performing a message-based load balancing decision on the first connection-less protocol datagram at the network traffic management device to assign the first connection-less protocol to a first server based on the message-based load balancing decision. The method includes converting, via the network traffic management device, the first connection-less protocol datagram into a first encapsulated data packet, wherein the data packet is encapsulated in accordance with a second connection-oriented protocol. The method includes sending the first encapsulated data packet from a first virtual server to the first server based on the message-based load balancing decision.

In an aspect, a non-transitory machine readable medium having stored thereon instructions message based load balancing. The medium comprises machine executable code which when executed by at least one machine associated with a network traffic management device, causes the machine to receive an encapsulated request from a client device to a destination server for an established session, wherein the request is encapsulated in accordance with a first connection-oriented protocol. The machine segments the encapsulated message into a plurality of encapsulated data segments in accordance with a message boundary parameter. The machine extracts identifying information of a first payload data packet of a first encapsulated data segment. The machine converts the first payload data packet into a first connection-less protocol datagram. The machine performs a message-based load balancing decision on the first connection-less protocol datagram, wherein the first connection-less protocol datagram is assigned to be sent to a first server via a first virtual server based on the message-based load balancing decision. The machine converts the first connection-less protocol datagram into a first encapsulated data packet, wherein the data packet is encapsulated in accordance with a second connection-oriented protocol. The machine sends the first encapsulated data packet from the first virtual server to the first server based on the message-based load balancing decision.

In an aspect, a network traffic management device for protocol conversions in policy changing enforcement comprises a network interface coupled to a client device and one or more servers via a network. The network interface receives a request from the client device requesting access to the server. The network traffic management device includes a processor coupled to the network interface. The processor is operative to receive an encapsulated request from a client device to a destination server for an established session, wherein the request is encapsulated in accordance with a first connection-oriented protocol. The processor is operative to segment the encapsulated message into a plurality of encapsulated data segments in accordance with a message boundary parameter. The processor is operative to extract identifying information of a first payload data packet of a first encapsulated data segment. The processor is operative to convert the first payload data packet into a first connection-less protocol datagram. The processor is operative to perform a message-based load balancing decision on the first connection-less protocol datagram, wherein the first connection-less protocol datagram is assigned to be sent to a first server via a first virtual server based on the message-based load balancing decision. The processor is operative to convert the first connection-less protocol datagram into a first encapsulated data packet, wherein the data packet is encapsulated in accordance with a second connection-oriented protocol. The processor is operative to send the first encapsulated data packet from the first virtual server to the first server based on the message-based load balancing decision.

While these examples are susceptible of embodiment in many different forms, there is shown in the drawings and will herein be described in detail preferred examples with the understanding that the present disclosure is to be considered as an exemplification and is not intended to limit the broad aspect to the embodiments illustrated.

DETAILED DESCRIPTION

Figure 1:
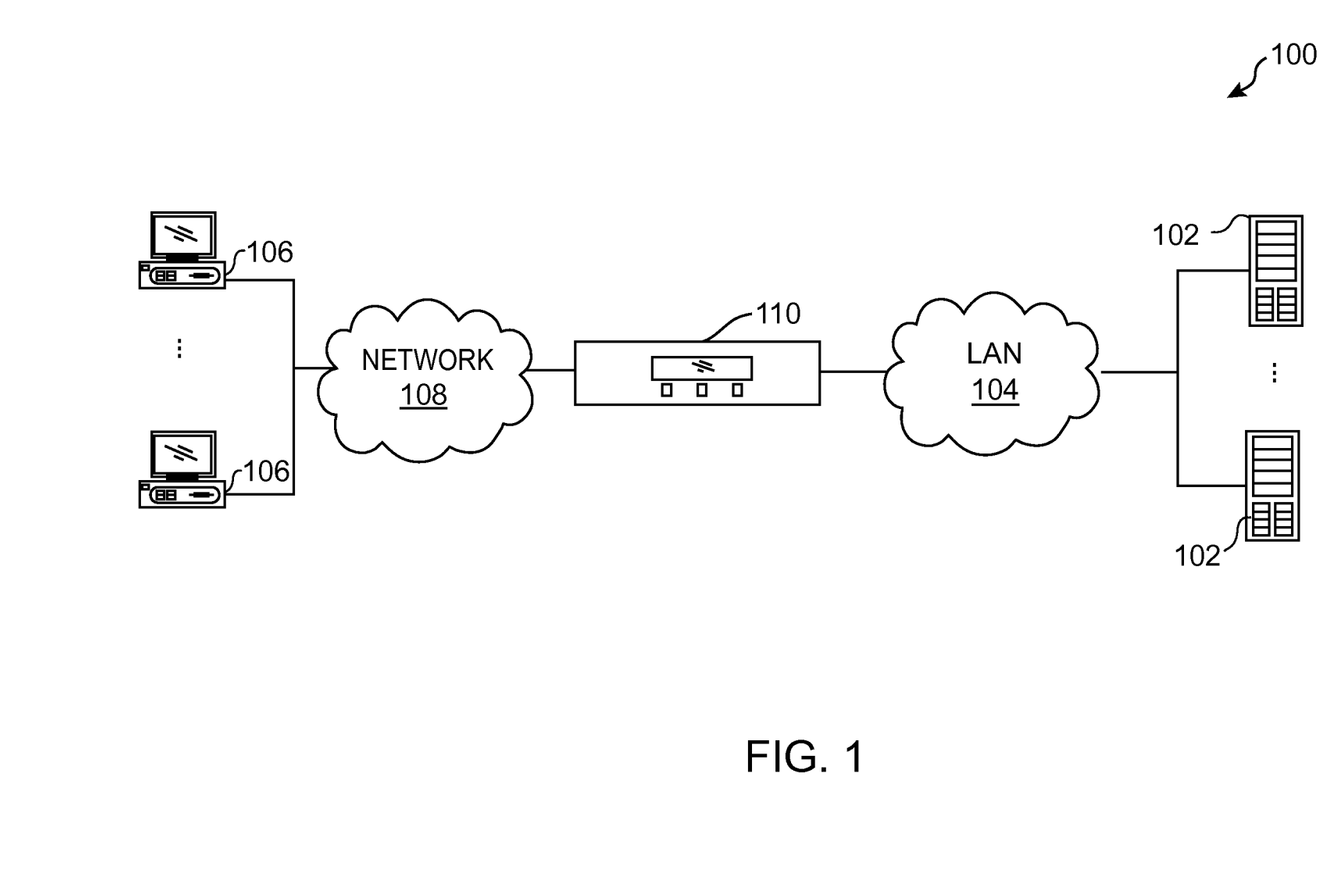
FIG. 1 is a diagram of an example system environment that includes a network traffic management device in accordance with an aspect of the present disclosure.

FIG. 1 is a diagram of an example system environment that includes a network traffic management device in accordance with an aspect of the present disclosure. Referring now to FIG. 1, an example system environment 100 employs one or more network traffic management device 110 that is capable of performing message-based load balancing. The example system environment 100 includes one or more Web and/or non-Web servers 102, one or more client devices 106 and the one or more network traffic management device 110, although the environment 100 could include other numbers and types of devices in other arrangements. The network traffic management device 110 is coupled to the web application servers 102 via local area network (LAN) 104 and client devices 106 via network 108. Generally, requests sent over the network 108 from client devices 106 towards the servers 102 are received by the network traffic management device 110. In an aspect, one or more of the client devices 106 are mobile devices which access and communicate with the servers 102 via one or more mobile gateways which allow communication over the Network 108.

Client devices 106 comprise network devices capable of connecting to other computing devices, such as the network traffic management device 110 and the server 102. Such connections are performed over wired and/or wireless networks, such as network 108, to send and receive data, such as for Web-based and/or non Web-based requests, receiving responses to requests and/or performing other tasks. Non-limiting and non-exhausting examples of such client devices include personal computers (e.g., desktops, laptops, tablets), smart televisions, stand alone multimedia devices, mobile and/or smart phones and the like. In an example, client devices 106 can run Web browsers that may provide an interface for operators, such as human users, to interact with for making requests for resources to different web server-based applications or Web pages via the network 108, although other server resources may be requested by clients. One or more Web-based applications may run on a web application server 102 that provide the requested data back to one or more network devices, such as client devices 106.

The server 102 comprises one or more server computing machines capable of operating one or more Web-based and/or non Web-based applications that may be accessed by other network devices in the network 108. Such network devices include client devices 106, the network traffic management device 110, and the like. The server 102 may provide data representing requested resources, such as particular Web page(s), image(s) of physical objects, and any other objects, responsive to the requests received from the client device 106. It should be noted that the server 102 may perform other tasks and provide other types of resources. It should be noted that while only two servers 102 are shown in the environment 100 depicted in FIG. 1, other numbers and types of servers may be coupled to the network traffic management device 110. It is also contemplated that one or more of the servers 102 may be a cluster of servers managed by one or more network traffic management devices 110.

Network 108 comprises a publicly accessible network, such as the Internet, which allows communications to and from client devices 106. However, it is contemplated that the network 108 may comprise other types of private and public networks that include other devices. Communications, such as requests from clients 106 and responses from servers 102, take place over the network 108 according to standard network protocols, such as the HTTP and TCP/IP protocols in this example. However, the principles discussed herein are not limited to this example and can include other protocols. Further, it should be appreciated that network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, cell towers and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. In essence, the network 108 includes any communication method by which data may travel between the client devices 106, the servers 102 and the network traffic management device 110, and the like.

LAN 104 comprises a private local area network that includes the network traffic management device 110 coupled to the one or more servers 102, although the LAN 104 may comprise other types of private and public networks with other devices. Networks, including local area networks, besides being understood by those skilled in the relevant arts, have already been generally described above in connection with network 108 and thus will not be described further.

As per the TCP/IP protocols, requests from the requesting client devices 106 may be sent as one or more streams of messages which include data packets over the network 108 to the network traffic management device 110 and/or the servers 102. Such Layer 4 protocols can establish connections, send and receive data for existing connections, and the like. It is to be understood that the one or more servers 102 may be hardware and/or software, and/or may represent a system with multiple servers that may include internal or external networks. In this example, the servers 102 may be any version of Microsoft® IIS servers, RADIUS servers, DIAMETER servers and/or Apache® servers, although other types of servers may be used. Further, additional servers may be coupled to the network 108 and many different types of applications may be available on servers coupled to the network 108.

As shown in the example environment 100 depicted in FIG. 1, the network traffic management device 110 is interposed between client devices 106 in network 108 and servers 102 in LAN 104. Again, the environment 100 could be arranged in other manners with other numbers and types of devices. Also, the network traffic management device 110 is coupled to network 108 by one or more network communication links and intermediate network devices (e.g. routers, switches, gateways, hubs and the like) (not shown). It should be understood that the devices and the particular configuration shown in FIG. 1 are provided for exemplary purposes only and thus are not limiting.

Generally, the network traffic management device 110 manages network communications, which may include one or more client requests and server responses, from/to the network 108 between the client devices 106 and one or more of the servers 102 in LAN 104. These requests and responses are sent between one or more client devices 106 and one or more servers 102 in the form of one or more TCP/IP data packets. The requests pass through one or more intermediate network devices and/or intermediate networks, until they ultimately reach the network traffic management device 110. In any case, the network traffic management device 110 may manage the network communications by performing several network traffic related functions involving the communications. Such functions include load balancing, access control, protocol conversion, segmentation of packets, and the like.

Figure 2:
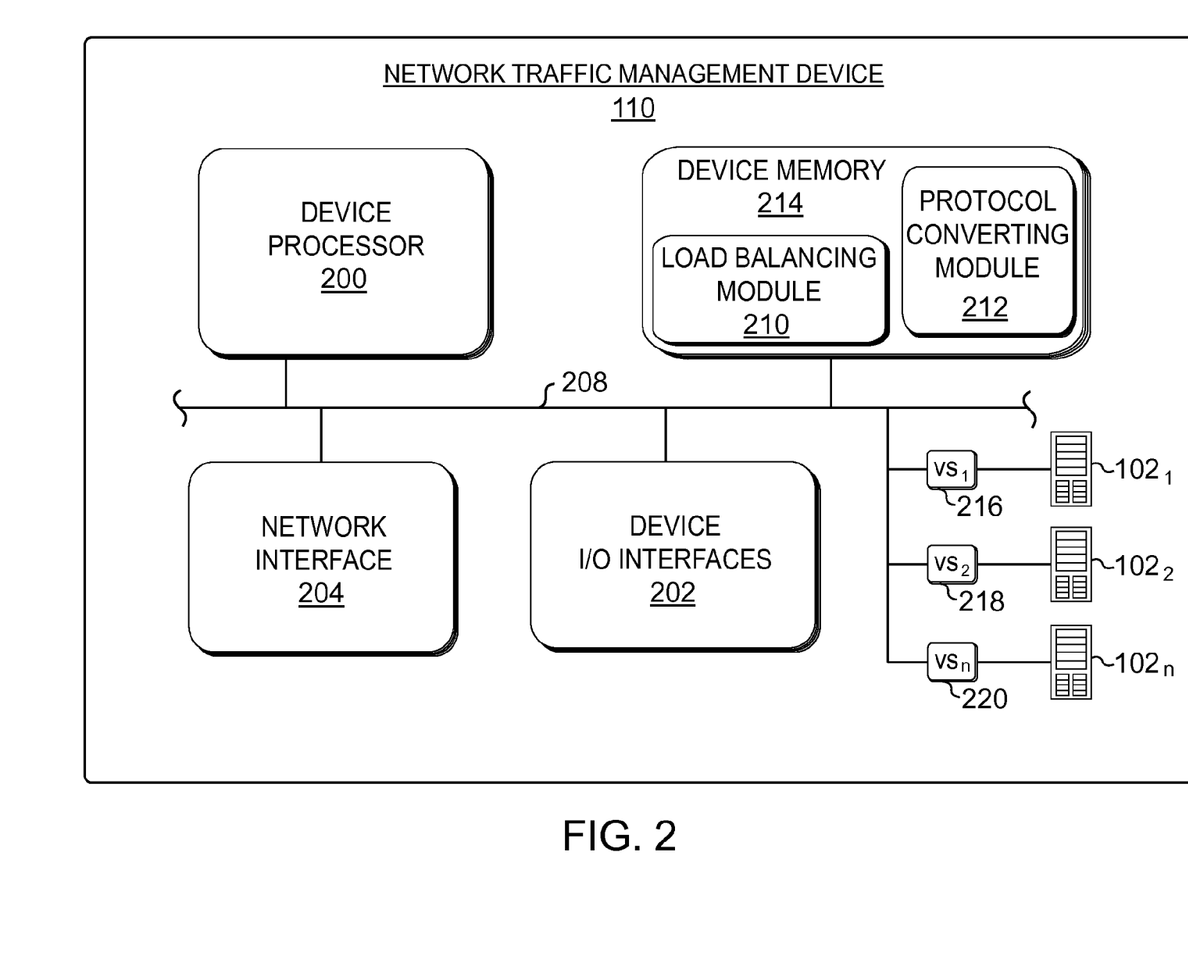
FIG. 2 is a block diagram of the network traffic management device shown in FIG. 1 in accordance with an aspect of the present disclosure.

FIG. 2 is a block diagram of an example network traffic management device shown in FIG. 1 in accordance with an aspect of the present disclosure. As shown in FIG. 2, the example network traffic management device 110 includes one or more device processors 200, one or more device I/O interfaces 202, one or more network interfaces 204, one or more load balancing modules 210, one or more protocol conversion modules 212, one or more device memories 214, and one or more virtual server modules 216, 218, and 220, all of which are coupled together via bus 208. It should be noted that the device 110 could include other types and numbers of components.

Device processor 200 comprises one or more microprocessors configured to execute computer/machine readable and executable instructions stored in device memory 214, and in particular the load balancing module 210 and the conversion module 212. Such instructions implement network traffic management related functions of the network traffic management device 110. In addition, the processor 200, upon executing the software instructions of the load balancing and conversion modules 210, 212, will perform one or more portions of the processes described below in accordance with an aspect of the present disclosure.

Device I/O interfaces 202 comprise one or more user input and output device interface mechanisms. The interface may include a computer keyboard, mouse, touch screen, display device, and the corresponding physical ports and underlying supporting hardware and software to enable the network traffic management device 110 to communicate with the outside environment. Such communications may include accepting user data input and to provide user output, although other types and numbers of user input and output devices may be used. Additionally or alternatively, as will be described in connection with network interface 204 below, the network traffic management device 110 may communicate with the outside environment for certain types of operations (e.g., configuration) via a network management port.

Network interface 204 comprises one or more mechanisms that enable network traffic management device 110 to engage in network communications using one or more network protocols (e.g. TCP, HTTP) over LAN 104 and network 108. However, it is contemplated that the network interface 204 may be constructed for use with other communication protocols and types of networks. Network interface 204 is sometimes referred to as a transceiver, transceiving device, or network interface card (NIC), which transmits and receives network data packets to one or more networks, such as LAN 104 and network 108. The network interface 204 is utilized by one or more virtual servers 216, 218, 220 to send and receive encapsulated data packets between the network traffic management device 110 and one or more physical servers 102.

In an example where the network traffic management device 110 includes more than one device processor 200 (or a processor 200 has more than one core), each processor 200 (and/or core) may use the same single network interface 204 or a plurality of network interfaces 204. Further, the network interface 204 may include one or more physical ports, such as Ethernet ports, to couple the network traffic management device 110 with other network devices, such as servers 102. Moreover, the interface 204 may include certain physical ports dedicated to receiving and/or transmitting certain types of network data, such as device management related data for configuring the network traffic management device 110.

Bus 208 may comprise one or more internal device component communication buses, links, bridges and supporting components, such as bus controllers and/or arbiters. The bus enable the various components of the network traffic management device 110, such as the processor 200, device I/O interfaces 202, network interface 204, EAM agent module 210 and device memory 214, to communicate with one another. However, it is contemplated that the bus may enable one or more components of the network traffic management device 110 to communicate with components in other devices as well. Example buses include HyperTransport, PCI, PCI Express, InfiniBand, USB, Firewire, Serial ATA (SATA), SCSI, IDE and AGP buses. However, it is contemplated that other types and numbers of buses may be used, whereby the particular types and arrangement of buses will depend on the particular configuration of the network traffic management device 110.

Device memory 214 comprises non-transitory computer readable media, namely computer readable or processor readable storage media, which are examples of machine-readable storage media. Computer readable storage/machine-readable storage media may include volatile, nonvolatile, removable, and non-removable media implemented in any method or technology for storage of information. Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the desired information. Such desired information includes data and/or computer/machine-executable instructions and which can be accessed by one or more processors 200 of the network traffic management device 110.

Such storage media contains computer readable/machine-executable instructions, data structures, program modules, or other data, which may be obtained and/or executed by one or more processors, such as device processor 200. Such instructions allow the processor to perform actions, including implementing an operating system for controlling the general operation of network traffic management device 110 to manage network traffic and execute the instructions of the load balancing and conversion modules 210, 212 in relation to the processes described in accordance with the present disclosure.

As shown in FIG. 2, the load balancing module 210 performs message-based load balancing logic on data messages received from external network devices, such as client devices 106 and servers 102. Additionally, the protocol conversion module 212 is configured to convert the messages from the connection-oriented protocol to a connection-less protocol. The virtual servers 216, 218, 220 process and transmit each of their assigned load balanced data packets to one or more dedicated physical servers 102.

As will be discussed in more detail below, the load balancing module 210 operates in conjunction with the protocol conversion module 212 to allow the network traffic management device 110 to effectively perform the message based load balancing process on any received message. In particular, the protocol conversion module 212 segments the encapsulated data packets and de-encapsulates the data segments to allow the load balancing module 210 to extract specific identifying information of the payload data along with other desired information. The extracted information is processed by the load balancing module 210 to allow it to make message-based load balancing decisions on each data packet. Converting the messages into the connection-less protocol allows the network traffic management device 110 to internally route each data packet to an assigned virtual server 216, 218, 220. The virtual servers 216, 218, 220 operate in conjunction with the network interface 204 as well as the load balancing module 210 and protocol converting module 212 to send and receive load balanced data packets with the physical servers 102.

In particular, each virtual server is configured to establish a connection with its dedicated server 102, via a handshake, that is independent of the original connection established between the client device 106 and the server 102. Once the connection is established, data packets assigned to a respective virtual server will be transmitted from that virtual server to its dedicated server 102. Additionally, response messages from each server are sent back to its dedicated virtual server in the network traffic management device 110. As shown in FIG. 2, virtual server 216 ($VS_1$) is shown to transmit and receive data packets to server $102_1$, whereas virtual server 218 ($VS_2$) is shown to transmit and receive data packets to server $102_2$. Similarly, virtual server 220 ($VS_n$) is shown to transmit and receive data packets to server $102_n$. It should be noted that although three virtual servers 216, 218, 220 are shown in FIG. 2, any number of virtual servers are contemplated. Additionally, it is contemplated that one or more virtual servers may be configured to communicate with more than one server 102, instead of just one server as shown in FIG. 2. It should also be noted that although the virtual servers 216, 218, 220 are shown within the network traffic management device 110, it is contemplated that the virtual servers 216, 218, 220 may be located external to the network traffic management device 110.

As mentioned above, the present system and method utilizes the advantages of a message-based connectionless transmission protocol, such as UDP, to allow message based load balancing logic to be effectively applied to one or more messages. However, considering that the connection that is established between the client devices 110 and the servers 102 are to be in compliance with a connection-oriented protocol, such as TCP, the present system and method ensures that all messages that are sent and received are in compliance with the connection-oriented protocol.

Figure 3:
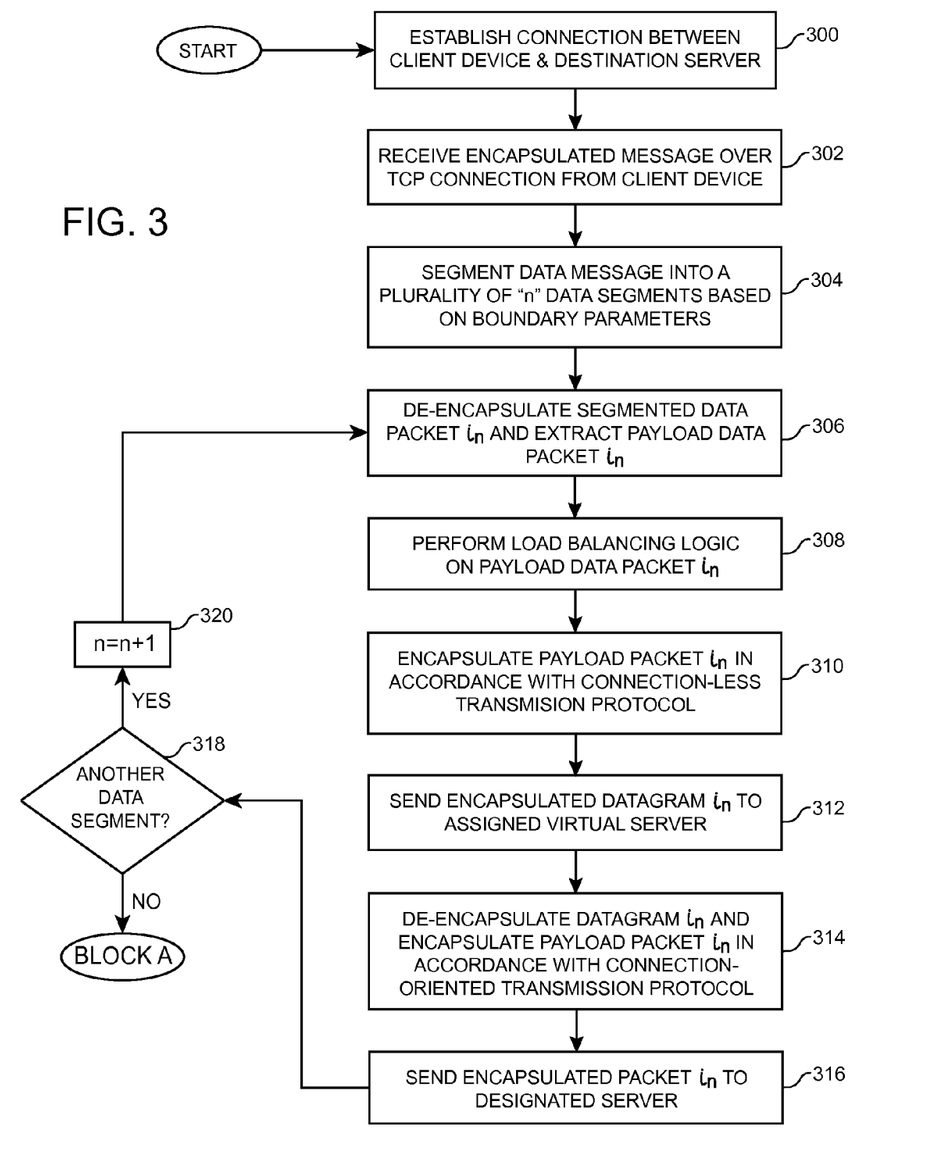
FIG. 3 is an example flow chart diagram depicting at least a portion of a process for performing message-based load balancing on requests sent from one or more client devices to one or more servers in accordance with the present disclosure.

FIG. 3 is an example flow chart diagram depicting at least a portion of a process for performing message-based load balancing on one or more requests received from one or more client devices in accordance with the present disclosure. As shown in FIG. 3, a user, via the client device 106, sends a request to access one or more resources from a destination server 102. To be able to allow the communication to occur between the client device 106 and the destination server 102, a connection is established between the client device 106 and the server 102 using traditional handshake methods (Block 300). The connection, once established, utilizes a Layer 4 connection-oriented transmission protocol, such as TCP, to allow data packets to be sent between the client device 106 and the server 102. As should be noted, one or more network traffic management devices 110 establish the connection as well as handle all network traffic between the client device 106 and the server 102. Although TCP is described in the present example as the connection-oriented protocol, it is contemplated that other connection-oriented protocols may be used for the connection between the client device 106 and the server 102.

Thus, when the request from the client device 106 is received at the network traffic management device 110, it is received as an encapsulated data message in accordance with a connection-oriented protocol (e.g. TCP) (Block 302). In performing the message-based load balancing process of the present disclosure, the load balancing module 210 of the network traffic management device 110 initially identifies the boundaries of the first or incoming encapsulated data message in accordance with a set boundary parameter and segments the data message into "N" number of data segments (Block 304). The byte sizes defined in the boundary parameter may be set by a network administrator, in an aspect. In an aspect, the network traffic management device 110 may be configured to generate each data segment to have the same byte size in accordance with the defined boundary parameter. In an aspect, the network traffic management device 110 may be configured to segment the data message in a way to have different sized data segments. In either event, the network traffic management device 110 stores the byte sizes of each data segment as this information is eventually used when converting the data segments, as will be discussed in more detail below.

Thereafter, the protocol converting module 212 of the network traffic management device 110 de-encapsulates each data segment $i_n$ and extracts necessary header information and payload data information (Block 306). In addition the payload data information and other header information, such as Session ID, source IP address and the like, can be extracted from the de-encapsulated data segment.

Additionally, the protocol converting module 212 encapsulates the payload data packet $i_n$ into a Layer 4 connectionless protocol datagram (Block 306). In an aspect, the protocol converting module 212 encapsulates the payload data packet $i_n$ into a UDP datagram, although other connectionless transmission protocols are contemplated.

In encapsulating the payload data packet $i_n$ into the connectionless transmission protocol datagram, the protocol converting module 212 will place, in the header of the datagram, the destination port number of the virtual server which will eventually transmit the data packet to the server, the IP address of the client device 106, the Session ID information as well as the IP address of the server 102 where the payload data packet $i_n$ is to be sent. Other information which allows successful outbound transmission of the data packet $i_n$ to the server is also inserted into the header and also stored in the internal memory 214 of the network traffic management device 110.

The load balancing module 210 of the network traffic management device 110 then examines the encapsulated datagram and, in particular, at least a portion of the payload data and key information code. The key information code is used by the load balancing module 210 to perform message-based load balancing logic on the datagram. In performing the load balancing logic, the load balancing module 210 utilizes the key information code to assign an appropriate server 102 where the datagram should be routed (Block 308).

In an example where the request message is sent from the client device using the Diameter protocol, the network traffic management device 110 examines an attribute-value pair (AVP) code in the request. The AVP code will identify one or more specific services related to authentication and authorization of services which need to be performed by a Diameter-based server. In other words, the network traffic management device 110 load balances requests that are based on the Diameter protocol using AVP codes even though the requests are sent over the same long-lived session. Since the sessions are long-lived for network traffic using the Diameter protocol, the load balancing logic employed by the load balancing module 210 is able to maintain connections to multiple servers 102 and thus correctly route requests based on the AVP codes contained within the Diameter messages. For other protocols, such as LDAP, these protocols may contain various information including search base, query string (LDAP filter) which the load balancing module 210 may use as the key information code to decide which server 102 to route the message to.

Subsequent messages received from the client device 106 over the connection with the same key information code will be processed and routed by the load balancing module 210 to the same designated server, although this is not necessary. In contrast, messages received over the same or different connection and containing a different key information code is processed and routed by the load balancing module 210 to a different server 102. The load balancing module 210 of the network traffic management device 110 is thus able to act upon message-level information rather than connection information to perform load balancing logic on the received messages.

After the load balancing module 210 performs the load balancing logic on the datagram and determines which server 102 to route the datagram to, the load balancing module 210, the network traffic management device 110 routes the encapsulated datagram to an assigned virtual server 216, 218, 220 that is dedicated to transmit the datagram to its assigned server 102. As stated above, each virtual server is configured to establish a connection with its dedicated server 102, via a handshake, that is independent of the original connection established between the client device 106 and the server 102.

As shown in FIG. 3, the encapsulated datagram is then sent to the appropriate virtual server 216, 218 or 220 for handling (Block 312). Generally, the virtual server in the network traffic management device 110 prepares the encapsulated datagram for transmission to the designated server 102 that has been identified in accordance with the load balancing logic step. In particular, the network traffic management device 110 de-encapsulates the datagram, and using the header information in the datagram, encapsulates the payload data packet into a Layer 4 connection-oriented transmission protocol, such as TCP (Block 314). In encapsulating the payload data packet in accordance with the TCP protocol, the network traffic management device 110 is able to insert destination information of the designated server 102 where the encapsulated segment is to be transmitted. If a connection to the designated server 102 has not already been established, the virtual server 216, 218, or 220 contacts the designated server 102 and uses the Session ID in the TCP header to allow the network traffic management device 110 to track the active sessions and also ensure proper routing of outbound and inbound data packets. It is also contemplated that the virtual server also inserts its IP address in the header information to enable data packets sent back from the server 102 to be correctly routed to the corresponding transmitting virtual server. In an example, virtual server 218 $VS_2$ would insert its IP address as the source address in the encapsulated header prior to sending the data packet to server $102_2$. This will allow any response messages sent from server $102_2$ to be received by virtual server 218 $VS_2$. The virtual server of the network traffic management device 110 then transmits the encapsulated data segment to the designated server 102 in accordance with the message-based load balancing process (Block 316).

As shown in FIG. 3, the process then proceeds as to whether there are other data segments that need to processed and load-balanced by the network traffic management device 110 (Block 318). If not, the process proceeds to Block A. Otherwise, the process returns to Block 306 to process and load balance other data segments $i_n$. For example, for a request that is segmented into twenty (20) data segments, the value "n" would be 20, whereby the network traffic management device 110 would process 19 other data segments after processing the first data segment. In the example in FIG. 3, the process at Block 318 continues where the "n" value is incremented by 1 to identify the next data segment to be processed (e.g. data segment $i_2$). It should be noted that although FIG. 3 indicates that each data segment is processed and transmitted sequentially, it is contemplated that the network traffic management device 110 may be able to perform the process on more than one data segment simultaneously.

Figure 4:
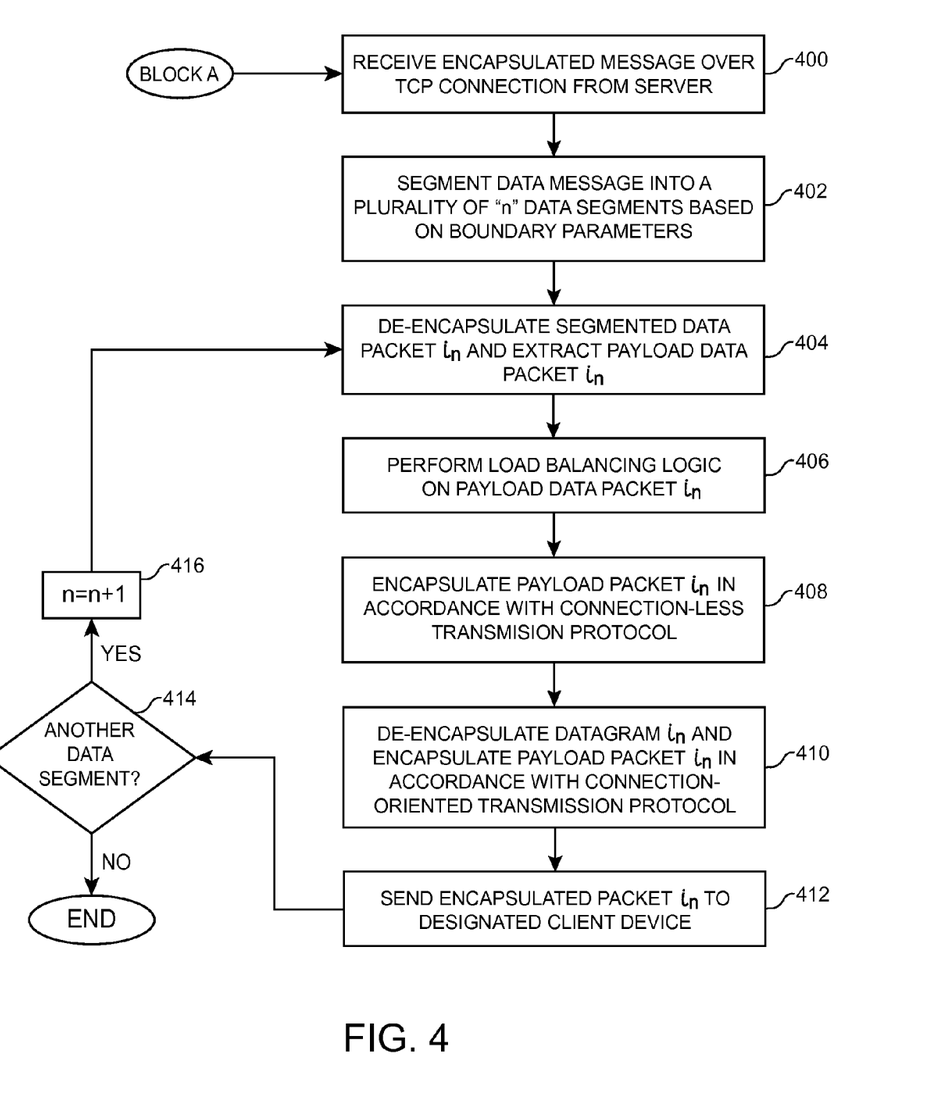
FIG. 4 is an example flow chart diagram depicting at least a portion of a process for performing message-based load balancing on responses sent from one or more servers to one or more client devices in accordance with the present disclosure.

FIG. 4 is an example flow chart diagram depicting at least a portion of a process for performing message-based load balancing on one or more requests received from one or more client devices in accordance with the present disclosure. As discussed in FIG. 3, data segments are designated by the load balancer module 210 to be sent out by assigned virtual servers to their corresponding destination servers 102. As shown in FIG. 4, TCP encapsulated response messages that correspond to the transmitted data segments are sent from the various servers 102 back to the network traffic management device 110. In particular, each TCP encapsulated data response message contains the source port address of the dedicated virtual server which previously sent the data segment. This allows the appropriate virtual server to receive and process the response message sent back from the server 102 (Block 400).

In particular, the network traffic management device 110, upon receiving the response message at its respective virtual server, initially segments the data message into "n" number of data segments, whereby the data segments have a set byte size in accordance with a set boundary parameter, as described above (Block 402).

Thereafter, the virtual server de-encapsulates each data segment and extracts necessary header information along with the payload data packet to effectively identify the appropriate client device where the payload data of the response should be routed (Block 404). In an aspect, Session ID information from the header information as well as the key information code for the data segment is processed to allow the network traffic management device 110 to identify which session the payload data belongs to.

The protocol converting module 212 of the network traffic management device 110 then encapsulates the payload data packet into a Layer 4 connectionless transmission protocol format, such as UDP, to generate an encapsulated datagram of the extracted payload data packet (Block 406). It should be noted that although UDP protocol is mentioned, other connectionless transmission protocols are contemplated.

As described in relation to the process in FIG. 3, when the network traffic management device 110 performs the above described procedure on messages sent from the client device 106 to the server 102, the network traffic management device 110 stores the identity of the requesting client device along with other information (e.g. Session ID) that maps the routing information between the client device 106 and the server 102 for each data packet. Accordingly, this mapped routing information is retrieved by the network traffic management device 110 and inserted into the header of the encapsulated datagram. This ensures that each response data segment is properly routed by the network traffic management device 110 to the appropriate client device 106.

Thereafter, the load balancing module 210 of the network traffic management device 110 performs load balancing logic on the datagram to effectively route the payload data to the proper client device 106 (Block 408). Similar to the process described in FIG. 3, subsequent messages received from any of the servers 102 that have the same key information code will be routed by the network traffic management device 110 to the same client device 106. In contrast, messages received over the same connection but containing a different key information code is processed by the network traffic management device 110 to another appropriate client device 106. The network traffic management device 110 is thus able to act upon message-level information rather than connection information to perform load balancing logic on the received response messages.

As shown in FIG. 4, the encapsulated datagram is then prepared by the network traffic management device 110 for transmission to the appropriate client device 106. In particular, the network traffic management device 110 de-encapsulates the datagram, and using the header information in the datagram, encapsulates the payload data packet into a Layer 4 connection-oriented transmission protocol, such as TCP (Block 410). In encapsulating the payload data packet in accordance with the TCP protocol, the network traffic management device 110 is able to insert routing information taken from the encapsulated datagram which identifies the client device 106 and the Session ID of the data segment (Block 410). The network traffic management device 110 then transmits the encapsulated data segment to the appropriate client device 106 along the existing connection between the client device 106 and the server 102 (Block 412).

As shown in FIG. 4, the process then proceeds as to whether there are other response data segments that need to processed and sent back to the client device 106 (Block 414). If not, the process ends at the End Block. Otherwise, the process proceeds to Block 414 to process and load balance other data segments $i_n$. For example, for a response that is segmented into twenty (20) data segments, the value "n" would be 20, whereby the network traffic management device 110 would process 19 other data segments after processing the first data segment. In the example in FIG. 4, the process continues to Block 416 where the "n" value is incremented by 1 to identify the next data segment to be processed (e.g. data segment $i_2$). It should be noted that although FIG. 4 indicates that each data segment is processed and transmitted sequentially, it is contemplated that the network traffic management device 110 may be able to perform the process on the more than one data segment simultaneously.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for message based load balancing comprising:
receiving, by a network traffic management device, an encapsulated request from a client device to a server for an established session, wherein the encapsulated request is encapsulated in accordance with a connection-oriented protocol;
segmenting, by the network traffic management device, the encapsulated request into a plurality of encapsulated data segments in accordance with a message boundary parameter;
extracting, by the network traffic management device, identifying information of a payload data packet of an encapsulated data segment of the plurality of encapsulated data segments, the identifying information comprising a session identifier for the established session;
converting, by the network traffic management device, the payload data packet into a connection-less protocol datagram;
performing, by the network traffic management device, a message-based load balancing decision on the connection-less protocol datagram to assign the connection-less protocol datagram to a server based on the message-based load balancing decision;
converting, by the network traffic management device, the connection-less protocol datagram into an encapsulated data packet, wherein the data packet is encapsulated in accordance with a second connection-oriented protocol; and
sending, by the network traffic management device, the encapsulated data packet from a virtual server to the server based on the message-based load balancing decision, wherein the session identifier is used to establish a connection between the virtual server and the server when a connection has not already been established.

2. The method of claim 1, further comprising:
extracting, by the network traffic management device, identifying information of a second payload data packet of a second encapsulated data segment associated with the encapsulated request;
converting, by the network traffic management device, the second payload data packet into a second connection-less protocol datagram at the network traffic management device;
performing, by the network traffic management device, the message-based load balancing decision on the second connection-less protocol datagram at the network traffic management device, wherein the connection-less protocol datagram is assigned to be sent to a second server based on the message-based load balancing decision;
converting, by the network traffic management device, the second connection-less protocol datagram into a second encapsulated data packet, wherein the data packet is encapsulated in accordance with the second connection-oriented protocol; and
sending, by the network traffic management device, the second encapsulated data packet from a second virtual server to a dedicated second server based on the message-based load balancing decision.

3. The method of claim 1, further comprising:
de-encapsulating, by the network traffic management device, the connection-oriented encapsulated data segment, wherein the de-encapsulated data segment comprises the payload data or a key information code.

4. The method of claim 1, wherein the converting the payload data packet into the connection-less protocol datagram further comprises:
encapsulating, by the network traffic management device, the payload data in accordance with the connection-less protocol.

5. The method of claim 1, wherein the connection-oriented protocol is a Transmission Control Protocol (TCP).

6. The method of claim 1, wherein the second connection-oriented protocol is a Transmission Control Protocol (TCP).

7. The method of claim 1, wherein the connection-less protocol is a User Datagram Protocol (UDP).

8. The method of claim 1, wherein the converting of the connection-less protocol datagram into the encapsulated data packet further comprises:
de-encapsulating, by the network traffic management device, the connection-less protocol datagram;
encapsulating, by the network traffic management device, the payload data packet into the encapsulated data packet, wherein the encapsulated data packet at least contains information identifying the virtual server as the source of transmission of the encapsulated data packet.

9. The method of claim 1, further comprising:
receiving, by the network traffic management device, an encapsulated response from the server for the established session, the response corresponding to the encapsulated data packet sent from the virtual server, wherein the response is encapsulated in accordance with the second connection-oriented protocol;
segmenting, by the network traffic management device, the encapsulated response into a plurality of encapsulated response data segments in accordance with the message boundary parameter;
extracting, by the network traffic management device, identifying information of a response payload data packet of a encapsulated response data segment of the plurality of encapsulated response data segments;
performing, by the network traffic management device, the message-based load balancing decision on the response payload data packet to identify the session and the client device where the response payload data packet is to transmitted;
converting, by the network traffic management device, the response payload data packet into the connection-less protocol datagram, wherein the connection-less protocol datagram is configured with information associated with the session between the client device and the server;
converting, by the network traffic management device, the connection-less protocol datagram into a second encapsulated response data packet, wherein the second encapsulated response data packet is encapsulated in accordance with the connection-oriented protocol; and
sending, by the network traffic management device, the second encapsulated response data to the client device based on the message-based load balancing decision.

10. A non-transitory computer readable medium having stored thereon instructions for message based load balancing, comprising machine executable code which when executed by at least one processor causes the processor to perform steps comprising:
receiving an encapsulated request from a client device to a server for an established session, wherein the encapsulated request is encapsulated in accordance with a connection-oriented protocol;
segmenting the encapsulated request into a plurality of encapsulated data segments in accordance with a message boundary parameter;
extracting identifying information of a payload data packet of an encapsulated data segment of the plurality of encapsulated data segments, the identifying information comprising a session identifier for the established session;
converting the payload data packet into a connection-less protocol datagram;
performing a message-based load balancing decision on the connection-less protocol datagram, wherein the connection-less protocol datagram is assigned to be sent to a server via a virtual server based on the message-based load balancing decision;
converting the connection-less protocol datagram into an encapsulated data packet, wherein the data packet is encapsulated in accordance with a second connection-oriented protocol; and
sending the encapsulated data packet from the virtual server to the server based on the message-based load balancing decision, wherein the session identifier is used to establish a connection between the virtual server and the server when a connection has not already been established.

11. The non-transitory computer readable medium of claim 10, further having stored thereon instructions that when executed by the processor cause the processor to perform steps further comprising:
extracting identifying information of a second payload data packet of a second encapsulated data segment associated with the encapsulated request;
converting the second payload data packet into a second connection-less protocol datagram;
performing a message-based load balancing decision on the second connection-less protocol datagram, wherein the connection-less protocol datagram is assigned to be sent to a second server based on the message-based load balancing decision;

converting the second connection-less protocol datagram into a second encapsulated data packet, wherein the data packet is encapsulated in accordance with the second connection-oriented protocol; and sending the second encapsulated data packet from a second virtual server to a dedicated second server based on the message-based load balancing decision.

12. The non-transitory computer readable medium of claim 10, further having stored thereon instructions that when executed by the processor cause the processor to perform steps further comprising:

de-encapsulating the connection-oriented encapsulated data segment, wherein the de-encapsulated data segment comprises at least the payload data or a key information code.

13. The non-transitory computer readable medium of claim 10, further having stored thereon instructions that when executed by the processor cause the processor to perform steps further comprising:

encapsulating the payload data in accordance with the connection-less protocol.

14. The non-transitory computer readable medium of claim 10, wherein the connection-oriented protocol is a Transmission Control Protocol (TCP).

15. The non-transitory computer readable medium of claim 10, wherein the second connection-oriented protocol is a Transmission Control Protocol (TCP).

16. The non-transitory computer readable medium of claim 10, wherein the connection-less protocol is a User Datagram Protocol (UDP).

17. The non-transitory computer readable medium of claim 10, wherein the converting of the connection-less protocol datagram into the encapsulated data packet further comprises:

de-encapsulating the connection-less protocol datagram; and encapsulating the payload data packet into the encapsulated data packet, wherein the encapsulated data packet at least contains information identifying the virtual server as the source of transmission of the encapsulated data packet.

18. The non-transitory computer readable medium of claim 10, further having stored thereon instructions that when executed by the processor cause the processor to perform steps further comprising:

receiving an encapsulated response from the server for the established session, the response corresponding to the encapsulated data packet sent from the virtual server, wherein the response is encapsulated in accordance with the second connection-oriented protocol;

segmenting the encapsulated response into a plurality of encapsulated response data segments in accordance with the message boundary parameter;

extracting identifying information of a response payload data packet of a encapsulated response data segment of the plurality of encapsulated response data segments;

performing the message-based load balancing decision on the response payload data packet to identify the session and the client device where the response payload data packet is to transmitted;

converting the response payload data packet into the connection-less protocol datagram, wherein the connection-less protocol datagram is configured with information associated with the session between the client device and the server;

converting the connection-less protocol datagram into a second encapsulated response data packet, wherein the second encapsulated response data packet is encapsulated in accordance with the connection-oriented protocol; and sending the second encapsulated response data to the client device based on the message-based load balancing decision.

19. A network traffic management device comprising:

a network interface coupled to a client device and one or more servers via a network, the network interface capable of receiving a request from the client device requesting access to the one or more servers;

at least one processor;

a memory coupled to the at least one processor and configured to be capable of executing programmed instructions, which comprise the programmed instructions stored in the memory to:

receive an encapsulated request from a client device to a server for an established session, wherein the encapsulated request is encapsulated in accordance with a connection-oriented protocol;

segment the encapsulated request into a plurality of encapsulated data segments in accordance with a message boundary parameter;

extract identifying information of a payload data packet of an encapsulated data segment of the plurality of encapsulated data segments, the identifying information comprising a session identifier for the established session;

convert the payload data packet into a connection-less protocol datagram;

perform a message-based load balancing decision on the connection-less protocol datagram, wherein the connection-less protocol datagram is assigned to be sent to a server via a virtual server based on the message based load balancing decision:

convert the connection-less protocol datagram into an encapsulated data packet, wherein the encapsulated data packet is encapsulated in accordance with a second connection-oriented protocol; and send the encapsulated data packet from the virtual server to the server based on the message-based load balancing decision, wherein the session identifier is used to establish a connection between the virtual server and the server when a connection has not already been established.

20. The network traffic management device of claim 19, wherein the at least one processor is further configured to be capable of executing programmed instructions, which comprise the programmed instructions stored in the memory to:

extract identifying information of a second payload data packet of a second encapsulated data segment associated with the encapsulated request;

convert the second payload data packet into a second connection-less protocol datagram;

perform a message-based load balancing decision on the second connection-less protocol datagram, wherein the connection-less protocol datagram is assigned to be sent to a second server based on the message-based load balancing decision;

convert the second connection-less protocol datagram into a second encapsulated data packet, wherein the data packet is encapsulated in accordance with the second connection-oriented protocol; and send the second encapsulated data packet from a second virtual server to a dedicated second server based on the message-based load balancing decision.

21. The network traffic management device of claim 19, wherein the at least one processor is further configured to be capable of executing programmed instructions, which comprise the programmed instructions stored in the memory to:
de-encapsulate the connection-oriented encapsulated data segment, wherein the de-encapsulated data segment comprises at least the payload data or a key information code.

22. The network traffic management device of claim 19, wherein the at least one processor is further configured to be capable of executing programmed instructions, which comprise the programmed instructions stored in the memory to:
encapsulate the payload data in accordance with the connection-less protocol.

23. The network traffic management device of claim 19, wherein the connection-oriented protocol is a Transmission Control Protocol (TCP).

24. The network traffic management device of claim 19, wherein the second connection-oriented protocol is a Transmission Control Protocol (TCP).

25. The network traffic management device of claim 19, wherein the connection-less protocol is a User Datagram Protocol (UDP).

26. The network traffic management device of claim 19, wherein the at least one processor is further configured to be capable of executing programmed instructions, which comprise the programmed instructions for the conversion of the connection-less protocol datagram into the encapsulated data packet stored in the memory to:
de-encapsulate the connection-less protocol datagram; and
encapsulate the payload data packet into the encapsulated data packet, wherein the encapsulated data packet at least contains information identifying the virtual server as the source of transmission of the encapsulated data packet.

27. The network traffic management device of claim 19, wherein the at least one processor is further configured to be capable of executing programmed instructions, which comprise the programmed instructions stored in the memory to:
receive an encapsulated response from the server for the established session, the response corresponding to the encapsulated data packet sent from the virtual server, wherein the response is encapsulated in accordance with the second connection-oriented protocol;

segment the encapsulated response into a plurality of encapsulated response data segments in accordance with the message boundary parameter;

extract identifying information of a response payload data packet of a encapsulated response data segment of the plurality of encapsulated response data segments;

perform the message-based load balancing decision on the response payload data packet to identify the session and the client device where the response payload data packet is to transmitted;

convert the response payload data packet into the connection-less protocol datagram, wherein the connection-less protocol datagram is configured with information associated with the session between the client device and the server;

convert the connection-less protocol datagram into a second encapsulated response data packet, wherein the second encapsulated response data packet is encapsulated in accordance with the connection-oriented protocol; and send the second encapsulated response data to the client device based on the message-based load balancing decision.

\* \* \* \* \*